United States Patent [19]

Link

[11] 4,061,927
[45] Dec. 6, 1977

[54] TIMING SYSTEM FOR WATERING DEVICES

[76] Inventor: Gustav A. Link, 3710 Lomitas Drive, Los Angeles, Calif. 90032

[21] Appl. No.: 684,762

[22] Filed: May 10, 1976

[51] Int. Cl.² ............................................. H02J 3/14
[52] U.S. Cl. ....................................... 307/41; 331/46
[58] Field of Search ..................... 307/41, 141, 141.4, 307/141.8, 38, 39, 40; 331/46

[56] References Cited

U.S. PATENT DOCUMENTS

| | | | |
|---|---|---|---|
| 3,604,943 | 9/1971 | Bayer | 307/41 |
| 3,723,753 | 3/1973 | Davis | 307/41 |

*Primary Examiner*—Herman Hohauser
*Attorney, Agent, or Firm*—Fred N. Schwend

[57] ABSTRACT

An electronic timing system for controlling a plurality of electrically controlled watering valves comprising a free running multivibrator circuit having a plurality of individually adjustable resistor-capacitor circuits for controlling the frequency. A divide-by-N counter, when filled, controls a stepping counter for successively activating different ones of the valves and, in turn, selects different ones of the resistor-capacitor circuits to control the time each of the valves is activated. Operation of the multivibrator circuit is initiated by a clock operated day-of-the-week counter having pre-settable switch means for enabling or disabling operation of the multivibrator circuit during any selected day. A repeat cycling control device is provided to selectively cause repeated cycling for different numbers of times and a delay device is provided to delay repeat cycling for different time periods.

10 Claims, 2 Drawing Figures

TIMING SYSTEM FOR WATERING DEVICES

BACKGROUND OF THE INVENTION

1. Field of the Invention

This invention relates to timing systems for automatic watering or sprinkling apparatus and has particular reference to timing systems for automatically controlling a plurality of watering devices in a predetermined sequence and for predetermined lengths of time.

2. Description of the Prior Art

Watering systems of the above type have been in use for a number of years. However, such systems in general are controlled by electromechanical timing devices, as disclosed, for example, in the U.S. Pat. Nos. to Gustav A. Link, Nos. 3,000,398; 3,234,446; 3,780,766; 3,911,955; and 3,925,683. Although such prior systems are generally satisfactory, they are expensive to manufacture and tend to become unreliable since the mechanical elements are subject to wear and consequent malfunctioning after a period of time.

SUMMARY OF THE INVENTION

A principal object of the present invention is to provide an electronic timing system for sequentially controlling a plurality of watering valves.

Another object is to provide a simple and economically manufactured electronic timing system effective to differentially and sequentially control the timing of different watering valves through a cycle or predetermined number of cycles.

Another object is to provide an electronic timing system for automatically controlling a plurality of watering valves which is effective to cause repeated cycling of the controls a preselected number of times.

Another object is to provide means for selectively delaying the restart of repeated cycling of the controls of an automatic electronic valve timing system for different time periods.

A further object is to provide means for selectively enabling or disabling control of the watering devices on any of different days of the week.

BRIEF DESCRIPTION OF THE DRAWINGS

The manner in which the above and other objects of the invention are accomplished will be readily understood on reference to the following specification when read in conjunction with the accompanying drawings, wherein.

DESCRIPTION OF THE PREFERRED EMBODIMENT

In order to understand the system of the present invention, it is deemed best to first describe the overall function and controls.

Figure 1:
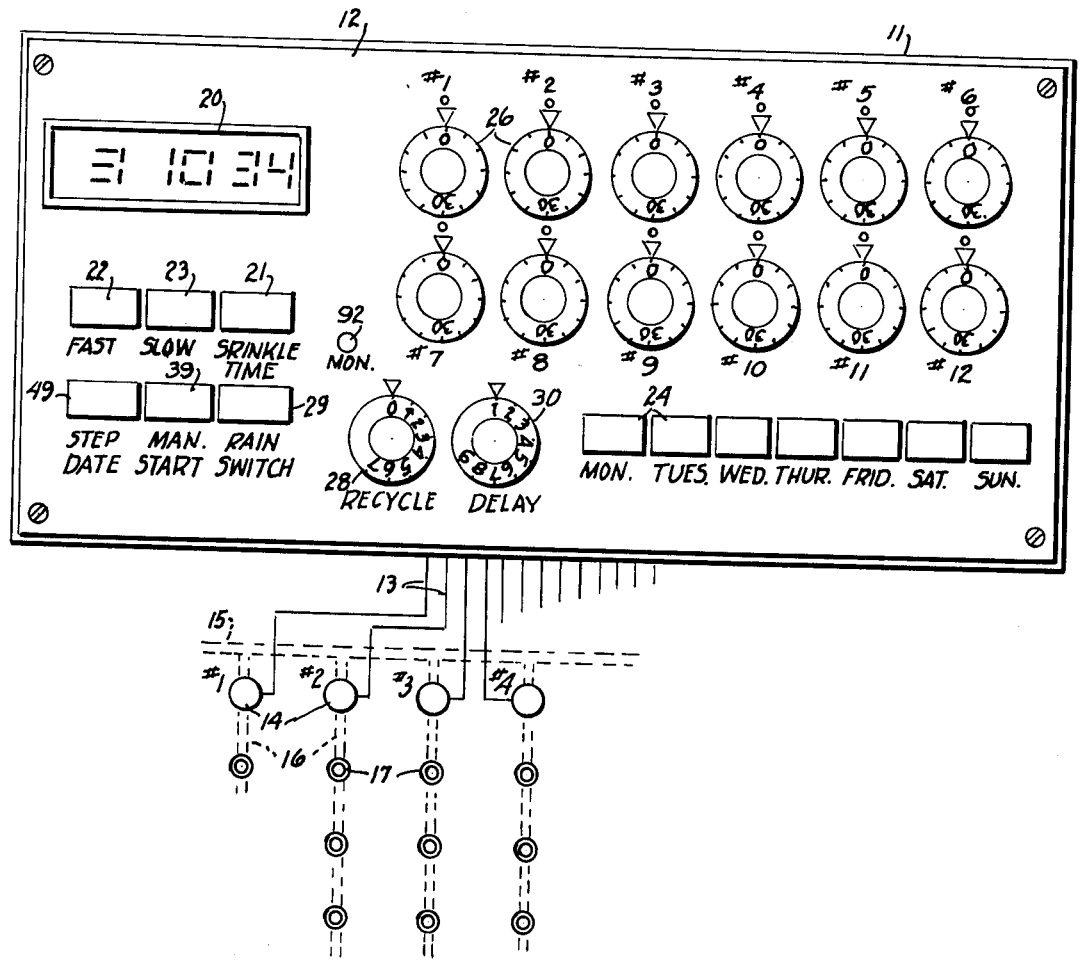
FIG. 1 is a front view of the housing and control panel of an electronic sprinkler control system embodying a preferred form of the present invention.

The control circuit is mainly contained within a housing 11 (FIG. 1) to which a control panel 12 is suitably attached. The control system is mounted mainly on the panel 12 and is connected through individual circuits 13 to 12 different stations comprising normally closed solenoid valves, generally indicated at 14, which may be of conventional construction. However, such valves are preferably pilot operated valves. The latter have their water inlets connected to a main supply line 15 of pressurized water and their outlets are connected to respective branch lines 16, one for each station, serving different areas and having one or more sprinkler heads 17 connected thereto.

An electrically operated clock 18 (FIG. 2) is provided to continuously register the time of day. Such clock may be a commercially available Fairchild Model No. 3817 D integrated circuit clock whose outlets, not shown, are connected to a digital display unit 20 (FIG. 1) for registering hours, minutes, and seconds. Clock 18 includes a settable alarm registering circuit, not shown, which is utilized in the present case to initiate a sprinkling cycle when the time registered by such circuit coincides with the time registered by the clock and normally indicated by the display unit 20.

In order to visually determine when the alarm circuit is to be energized, a "Sprinkle Time" button 21 is depressed, causing the display unit to indicate the sprinkle initiate time instead of the current time of day. In order to change the sprinkle initiate time, a "Fast" button 22 or a "Slow" button 23 is depressed concurrently with depression of the button 21, causing a count up of the alarm registering circuit until a desired (alarm) sprinkle initiate time is reached.

According to the present invention, a series of depressible day switch buttons 24 are provided, one for each day of the week. Such buttons are connected to respective ones of switches 25, FIG. 2, whereby depression of one or more switch buttons 24 to set positions will open respective ones of switches 25 to cause sprinkling cycles on the corresponding days. By depressing any button 24 a second time, it will be returned to its original unset position and its switch 25 will be closed to prevent sprinkling on that day.

A series of twelve station control knobs 26 are provided to control the elapsed time in minutes during which sprinkling is to occur at correspondingly numbered ones of the stations. Such knobs are connected to respective ones of a series of variable resistors 27, FIG. 2.

A "Recycle" knob 28, connected to an electrical contact brush 29, is provided to control a recycle circuit to cause the controls to follow through a selected number of recurring sprinkling cycles, up to seven, at the individual time periods set by the different knobs 26. This is of particular advantage, for example, when watering a new lawn in which case it may be desired to sprinkle at the different stations for brief periods only but at repeated intervals to provide sufficient watering and yet prevent newly planted seeds or seedlings from being washed away.

A delay control, including a "Delay" knob 30 connected to a variable resistor 48 is provided to control the elapsed time between each of recurring cycles in the event recycling is scheduled by setting of the knob 28.

A "Rain Switch" button 29 is provided which, when set, opens a normally closed switch 83 to prevent sprinkling for any desired period, as for example, during a raining period. Such action, however, does not interrupt operation of the timing controls and sprinkling may be resumed at any time by again depressing the button 29 which returns the same from its set condition to close switch 83.

A "Manual Start" button 39 is provided which when momentarily depressed, momentarily closes a switch 84 to initiate a sprinkling cycle at any time regardless of the time at which the sprinkle initiate unit of the clock 18 is set to cause sprinkling.

Also, a "Step Date" button 49 is provided which when momentarily depressed, closes a switch 85 to step a "day of week" counter 37 to register the proper day of the week in the event the latter is not properly synchronized due to power failure or other reasons.

Figure 2:
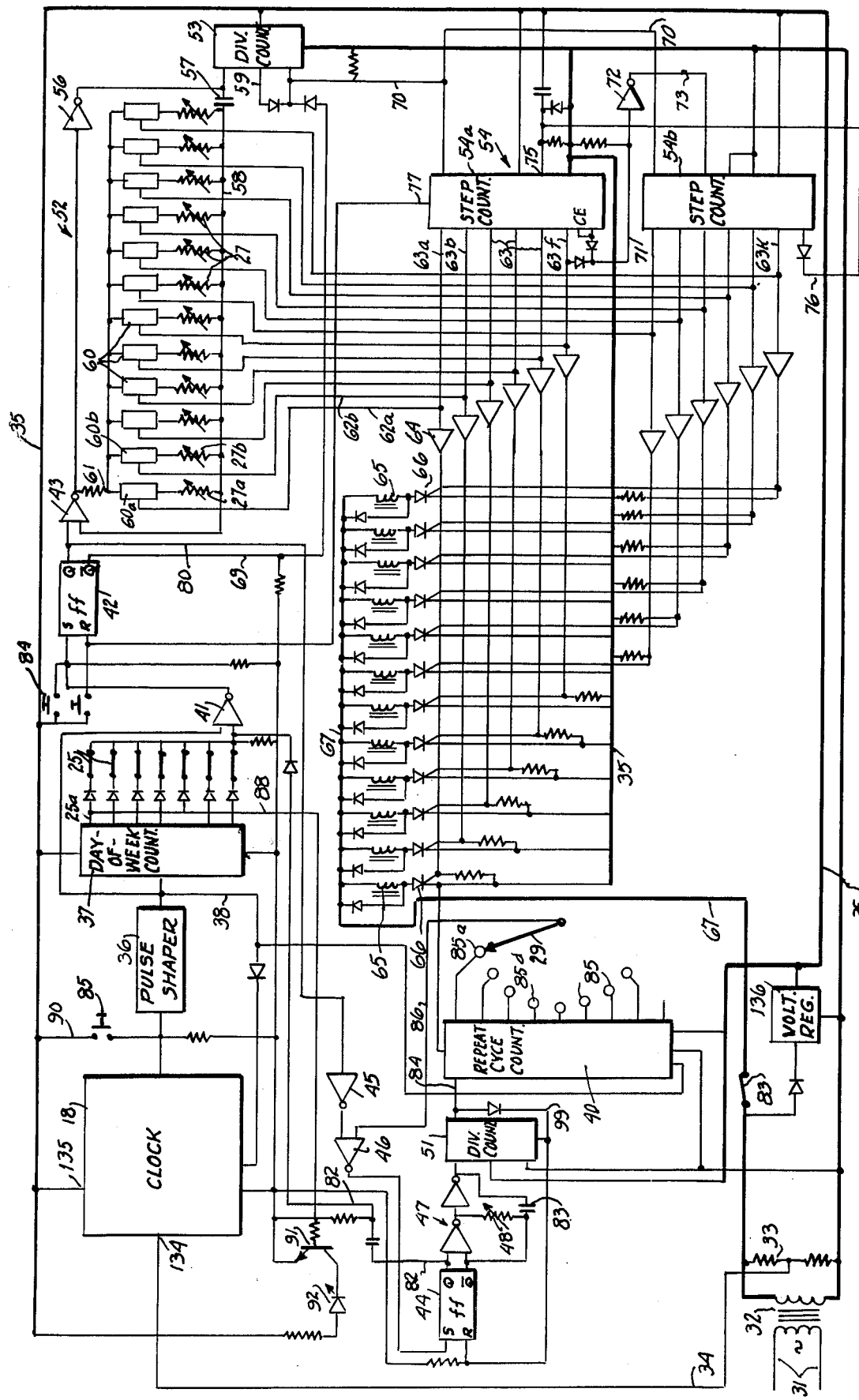
FIG. 2 is a schematic diagram illustrating the control circuit.

Describing now the circuitry of FIG. 2, the clock 18 is operable by a standard alternating current supply circuit 31 and for this purpose, it's power terminals 134 and 135 are connected to the output of a step down transformer 32 through a voltage divider 33 and lines 34 and 35. A voltage regulator 136 is provided in the line 35 to closely regulate the voltage.

Upon coincidence between the time registered by the aforementioned alarm registering circuit and the time-of-day circuit of clock 18, a signal will be transmitted through a pulse shaping circuit 36 to the input of a seven stage "day-of-week" stepping counter 37. For this purpose, a commercially available counter, such as the RCA Model 4022 integrated circuit counter may be used. Such signal is also transmitted over line 38 to turn off the alarm circuit in clock 18, to reset a repeat cycle stepping counter 40 and to apply a signal to one input of a nor gate 41.

The aforementioned day switches 25 are connected between the respective outputs of the counter 37 and the second input of gate 41 so that when a cycle initiate signal is received on the day on which a corresponding switch is open, the negative going side of such signal will cause gate 41 to transfer a set signal to the set input of a normally reset flip-flop 42, setting the same whereby to cause its outlet Q to apply a low level signal to a nor gate 43 forming part of a special free running multivibrator circuit 52, causing operation of the same. However, on a day which the corresponding day switch 25 is closed, a high level signal will be applied to the second input of gate 41 and therefor no set signal will be applied to the flip-flop 42, causing it to remain in its reset condition to suppress operation of the circuit 52.

The multivibrator circuit 52 is used to control the length of time each of the sprinkling stations is operated, as will be described presently. Circuit 52 includes an inverter gate 56 connected to the outlet of gate 43, and a series of transmission switches or normally closed gates 60 connected between the outlet of gate 43 and respective ones of the above mentioned variable resistors 27. The latter are connected through a common line 58 and capacitor 57 to the input of a scale down or "divide-by-213th" counter 53 effective to provide an output signal over a line 59 after receiving 8192 pulses.

The portion of the multivibrator circuit 52 including transmission switches 60, may be part of a commercially available RCA Model CD 4016 AE integrated circuit quad bilateral switch, and counter 53 may be commercially available RCA Model 4020 divide counter.

The output of counter 53 is effective, through lines 59 and 70 to step a switching device comprising a two part stepping counter 54 having twelve output lines 63 connected in circuit with solenoids 65 for respective ones of the valves 14, as will presently be described.

An initial signal to step the counter 54 from a normal 0 state to its No. 1 state wherein the upper No. 1 output line 63a registers a high level output is derived from the Q outlet of flip-flop 42 over lines 69, 70. Accordingly, a control signal is transferred over lines 63a and 62a to close a No. 1 transmission switch 60a of circuit 52 and thus complete a circuit through the variable resistor 27a and capacitor 57 to the input of counter 53. Therefore, the frequency of pulses generated by the multivibrator circuit 52 and applied to the counter 53 will be determined by the RC constant of resistor 27a and capacitor 57 only. Therefore, the time that it takes for counter 53 to fill and to apply a stepping pulse to counter 54 (which is the determining factor controlling the elapsed time that sprinkling will occur at station No. 1) will be directly proportional to the frequency of circuit 52 under control of resistor 27a and capacitor 57.

Upon stepping of counter 54 to its No. 2 state, a signal will be applied over lines 63b and 62b to close the No. 2 transmission switch 60b to enable variable resistor 27b and capacitor 57 to now control the frequency of pulses applied to counter 53 and thus the elapsed time of sprinkling at station No. 2 will depend on such frequency. During this time transmission switch 60a and all other transmission switches except tranmission switch 60b will be open.

The above procedure will be repeated until all stations have been activated for elapsed times under control of respective ones of the resistors 27 which have been preset by respective knobs 26.

For the purpose of energizing the valve solenoids 65, each output line 63 is connected through an amplifier 64 to the control electrode of a respective SCR 66 which is in circuit between the respective solenoid 65 and power supply lines 35 and 67.

As noted heretofore, the counter 54 is in two units, i.e. 54a and 54b, each having six output lines 63. In other respects, such counter units may be similar to counter 37. Normally, although count pulses are applied to the input terminals of both counter units 54a and 54b through line 70, counting by unit 54b is initially inhibited by a high level signal applied by inverter gate 72 and line 73 to the reset terminal of unit 54b so that counting occurs in the unit 54a only. However, when output line 63f of unit 54a is energized to enable sprinkling at station No. 6, the latter will apply a signal over line 71, gate 72 and line 73 to apply a low level signal to the reset terminal of unit 54b and thus cause unit 54b to receive subsequent count pulses from counter 53. At this time, an inhibit signal will be applied to the clock enable terminal of unit 54a to subsequently prevent count pulses from being applied to this unit. Accordingly, the counter unit 54b will continue to count pulses applied from counter 53 unitl the sprinkling cycle is completed at which time a signal will be applied from unit 54b, over line 76 to reset counter unit 54a to zero. A reset signal will now be applied over zero registering line 77 to reset flip-flop 42, thus stopping the multivibrator 52.

Describing now the recycling controls, the flip-flop 42 controls a second flip-flop 44 effective to control a free running multivibrator generally indicated at 47. For this purpose a Q terminal of flip-flop 42 is connected through line 80, inverter gate 45 and nor gate 46 to the set terminal of flip-flop 44 so that setting of flip-flop 42 may cause a corresponding setting of flip-flop 44, initiating operation of multivibrator 47. The latter is similar to multivibrator 52 but incorporates only the single aforementioned variable resistor 48 and a capacitor 83 whose RC constant controls the frequency of operation of the multivibrator 47 to apply count pulses to a "divide-by-213th" or scale down counter 51, similar to counter 53. The output of counter 51 is applied over line 84 to the repeat cycle stepping counter 40, similar to counters 37 and 54 except that it has eight output terminals 85, including a "0" terminal 85a, all selectively engageable by the aformentioned contact arm 29 of the recylce knob 28. The output of counter 51 is also applied over line 99 to reset flip-flop 44. Arm 29 is connected through line 86 and the second input terminal of gate 46 to the set input of flip-flop 44. If arm 29 is set at 0 terminal 85a, setting of flip-flop 44 under control of flip-flop 42 will be inhibited by a signal from 0 terminal 85a to close gate 46. Therefore, no recycling will occur. However, if arm 29 is set to contact No. 3 terminal 85d, for example, setting of flip-flop 42 will set flip-flop 44 and a signal will be transferred from the Q terminal of flip-flop 44 over line 82 to the input of gate 41 to set flip-flop 42 and thus start a second sprinkling cycle. This will continue until the third cycle at which time a signal from counter terminal 85d will be transferred by arm 29 to hold gate 46 closed and thus stop recycling.

The normally closed "rain" switch 83 is connected in the power supply line 67 and is opened upon setting of the "Rain" button 29 to prevent energization of any of the valve solenoids 65 even though the timing controls continue through a current cycle.

A sprinkling cycle may be initiated at any time, regardless of the setting of the alarm initiate circuit of clock 18, by momentarily closing the manual switch 84 by the "Manual Start" button 39, the switch 84 being connected between the power supply line 35 and the set terminal of flip-flop 42 so that closing of switch 84 will set flip-flop 42.

Depression of the "Step Date" button 49 to close the set date switch 85 applies a signal over line 90 to step the day of week counter 37. This may be desirable in the event of power failure or upon initial installation of the system in order to register the proper day of the week. In order to properly set the counter 37, its "Monday" output terminal 25a is connected by line 88 to the base of a transistor 91 whose emitter-collector circuit is in series with a light emitting diode 92 mounted on the panel 12. Accordingly, in synchronizing the counter 37 with the proper day of the week, the button 49 is repetitively depressed, causing closure of switch 85 until the diode 92 is illuminated, indicating that the counter is set to register a Monday. Thereafter, the button 49 may be depressed a number of times to cause counter 37 to step until it registers the current day of the week.

The system may be readily expanded or contracted to control a greater or less number of stations.

It will be obvious to those skilled in the art that many variations may be made in the exact structure shown without departing from the spirit of this invention.

I claim:

1. A timing system for a plurality of electrically controlled watering devices comprising,
   means for producing repetitive pulses,
   a plurality of normally disabled frequency control devices for controlling said means to produce pulses of different frequencies,
   means for manually preconditioning said control devices for selected frequencies,
   means for initiating operation of said pulse producing means,
   a divide-by-N counter for counting said pulses and effective to produce an output signal upon registering N pulses from said pulse producing means,
   an electronic switching device having a plurality of outputs for connection to respective ones of said watering devices,
   said switching device comprising means controlled by said output signals for applying energizing signals successively to different ones of said outputs whereby to energize respective ones of said watering devices; and
   means responsive to said energizing signals for successively enabling different ones of said frequency control devices to control said pulse producing means.

2. A timing system as defined in claim 1 wherein said last mentioned means comprises said switching device.

3. A timing system as defined in claim 1 wherein said frequency control devices are independently adjustable.

4. A timing system as defined in claim 1 comprising
   a second switching device having day outlets representing days of the week,
   clock means operable each day to cause said second switching device to successively energize different ones of said day outlets, and
   control means controlled by said day outlets when energized for causing operation of said initiating means.

5. A timing system as defined in claim 4 comprising means for selectively disabling any of said day outlets.

6. A timing system as defined in claim 4 comprising manually operable means independent of said control means for selectively causing operation of said initiating means.

7. A timing system as defined in claim 1 comprising
   repeat cycle control means responsive to the enablement of the last said frequency control device for operating said initiating means, and
   means for controlling said repeat cycle control means to operate said initiating means a preselected number of times.

8. A timing system as defined in claim 7 comprising
   means for delaying operation of said repeat cycle control means, and
   selectively settable means for predetermining the extent of said delay.

9. A timing system for a plurality of electrically controlled watering devices comprising,
   a free running multivibrator circuit,
   said multivibrator circuit including a plurality of normally disabled frequency control devices,
   means for initiating operation of said multivibrator circuit,
   a divide-by-N counter controlled by said multivibrator circuit and effective to produce an output signal upon registering N signals from said multivibrator circuit,
   an electronic switching device having a plurality of outputs for connection to respective ones of said watering devices,
   said switching device comprising means controlled by said output signals for applying energizing signals successively to different ones of said outputs; and
   means responsive to said output signals for successively enabling different ones of said frequency control devices to control said multivibrator circuit.

10. A timing system as defined is claim 9 wherein said frequency control devices comprise
    resistor-capacitor circuits, and
    means for independently adjusting the RC constants of said resistance-capacitor circuits.

* * * * *